(12) United States Patent
Ligas et al.

(10) Patent No.: US 8,534,853 B2
(45) Date of Patent: Sep. 17, 2013

(54) BACKLIGHT MODULE

(75) Inventors: Marty Ligas, Taoyuan (TW); Yu-Jeng Lin, Taoyuan (TW); Melanie Gerdeman, Taoyuan (TW)

(73) Assignee: Global Lighting Technology Inc., Taoyuan (TW)

( * ) Notice: Subject to any disclaimer, the term of this patent is extended or adjusted under 35 U.S.C. 154(b) by 447 days.

(21) Appl. No.: 12/987,172

(22) Filed: Jan. 10, 2011

(65) Prior Publication Data
US 2012/0020055 A1    Jan. 26, 2012

(30) Foreign Application Priority Data
Jul. 26, 2010  (TW) ................................ 99124556 A

(51) Int. Cl.
*G01D 11/28* (2006.01)
(52) U.S. Cl.
USPC ......... 362/23.03; 362/23.1; 362/85; 362/612; 362/613; 362/617; 200/317; 349/65

(58) Field of Classification Search
USPC .................. 362/23.1, 85, 612, 613, 617, 621; 200/317
See application file for complete search history.

(56) References Cited

U.S. PATENT DOCUMENTS

| | | | |
|---|---|---|---|
| 7,086,768 B2 * | 8/2006 | Suwa et al. | 362/612 |
| 7,891,829 B2 * | 2/2011 | Takeda et al. | 362/85 |
| 8,388,156 B2 * | 3/2013 | Chen | 362/85 |
| 2004/0257829 A1 | 12/2004 | Suwa et al. | |

* cited by examiner

*Primary Examiner* — Stephen F Husar
(74) *Attorney, Agent, or Firm* — CKC & Partners Co., Ltd.

(57) ABSTRACT

A backlight module comprises a light emitting element and a light guide panel having a light output surface in which the light output surface is with a first side, a second side, a through hole, a recess and plural microstructure rows. The microstructure rows are arranged on the light output surface, and the extending direction thereof is parallel to the extending direction of the first side. The through hole is installed between any two adjacent microstructure rows. The light emitting element is disposed in the recess in a central zone of the light output surface, and arranged to emit lights towards the second side. One major light emitting axis of the light emitting element deviates from the through hole.

10 Claims, 8 Drawing Sheets

BACKLIGHT MODULE

RELATED APPLICATIONS

This application claims priority to Taiwan Application Serial Number 099124556, filed Jul. 26, 2010, which is herein incorporated by reference.

BACKGROUND

1. Technical Field

The present invention relates to a backlight module, more particular to a backlight module equipped with a light guide panel.

2. Description of Related Art

With the development of technology, the designs for computer keyboard are getting matured and varied. Beside the considerations of required functions, the appearance of the product might recently be an important role to determine the sales volume so it is getting more critical for the product competitiveness. For example, light emitting keyboards have been launched in the commercial market, and the light emitting keyboard not only provides a better visual attraction but also provides illumination at night time or locations for dusk environment.

A conventional light emitting keyboard is installed with a light guide panel and a light source. The light-incident surface of the light guide panel is defined at an outer side where the thickness of the light guide panel is presented, and the light output surface of the light guide panel is defined at one of the two largest surfaces. The light guiding method of the light guide panel is to install the light source adjacent to the light-incident surface, so light from the light source can be introduced into the light guide panel from the light-incident surface, with the feature of the light guide panel, the light can be guided to the light output surface for providing a planar light source.

For some purposes, such as installation, heat dissipation, the light guide panel is inevitably installed with one or more through holes for achieving the mentioned purposes. However, the luminance of the light transmitting in the light guide panel may be affected by the through hole, or the light to be transmitted in the light guide panel to a distal end away from the light source may be terminated, the light field at the corners of a light emitting keyboard may be dark, and the illumination uniformity of the whole light emitting keyboard may not be sufficient.

SUMMARY

The present invention discloses a backlight module in which the most intensive light of a light source deviating through holes in order to prevent the lighting luminance from being untimely consumed.

The backlight module comprises a light guide panel and a first light emitting element. The light guide panel includes a light output surface. The light output surface has a first side, a second side, a first through hole, a first recess and plural microstructure rows. The microstructure rows are spaced to be arranged on the light output surface, and the extending direction of each microstructure row is parallel to the extending direction of the first side. The first through hole is installed between any two adjacent microstructure rows. The recess is installed in a central zone of the light output surface. The first light emitting element is disposed in the first recess and arranged to emit lights towards the second side. As such, with the installation of the first light emitting element, one major light emitting axis of the first light emitting element can deviate from the first through hole.

According to one embodiment of the present invention, the first recess and the first through hole are installed between the two same microstructure rows, and a first included angle is defined by the major light emitting axis of the first light emitting element and a reference axis parallel to the first side. According to this embodiment, the first included angle is 3-5 DEG.

According to another embodiment of the present invention, the light output surface of the light guide panel further includes a second recess. The second recess is installed in the central zone of the light output surface of the light guide panel. The backlight module further comprises a second light emitting element. The second light emitting element is disposed in the second recess, and the light emitting direction thereof is opposite to the light emitting direction of the first light emitting element.

According to the another embodiment, one major light emitting axis of the second light emitting element is not parallel to an extending direction of the first side, and a second included angle is defined by the major light emitting axis of the second light emitting element and the reference axis parallel to the first side. According to another embodiment, the second included angle is 3-5 DEG.

As one alternative of another embodiment, the second recess and the first recess are both installed between the two same microstructure rows. As another alternative of another embodiment, the second recess and the first recess are not respectively installed between the two same microstructure rows.

Moreover, according to another embodiment, the light guide panel further includes a second through hole. The second through hole and the second recess are installed between the two same microstructure rows. As such, with the installation of the second light emitting element, the major light emitting axis of the second light emitting element deviates from the second through hole, and the light emitting direction of the second light emitting element is opposite to the light emitting direction of the first light emitting element.

As one another alternative of another embodiment, the light output surface of the light guide panel further includes a third recess. The third recess is installed in the central zone of the light guide panel. The backlight module further comprises a third light emitting element. The third light emitting element is disposed in the third recess, and arranged to emit lights towards the first side. With the installation of the third light emitting element, one major light emitting axis of the third light emitting element passes through a section between the first light emitting element and the second light emitting element. Moreover, each microstructure row has a plurality of microstructure patterns spaced to arrange with each other. The third recess is installed in one of the microstructure patterns.

Accordingly, the present invention deviates the major light emitting axis of light emitting element for dodging the through holes, so as to be prevented from being affected by the through holes, and capable of reaching a corner location of the first side or the second side which are away from the light guide panel, so the first side or the second side of the light guide panel can be provided with a proper lighting luminance, and the lighting luminance at the corners of an electronic device is enhanced, and the illumination uniformity of the whole electronic device is also increased.

BRIEF DESCRIPTION OF THE DRAWINGS

The present invention will be apparent to those skilled in the art by reading the following detailed description of a preferred embodiment thereof, with reference to the attached drawings, in which.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

For some purposes, such as installation, heat dissipation or optical guidance, a light guide panel is inevitably installed with one or more through holes for achieving the mentioned purposes. However, the luminance of the light transmitting in the light guide panel may by affected by the through holes, and the light field at the corners of a light-emitting keyboard may be decreased. The present invention discloses a backlight module in which each major light emitting axis of light sources is deliberately arranged not to pass through the through holes, so lights can be transmitted to a distal end of the light guide panel without any obstacle, such that the light strength of each light emitting axis of the light sources is prevented from being unnecessarily consumed due to passing through the through holes.

Figure 1A:
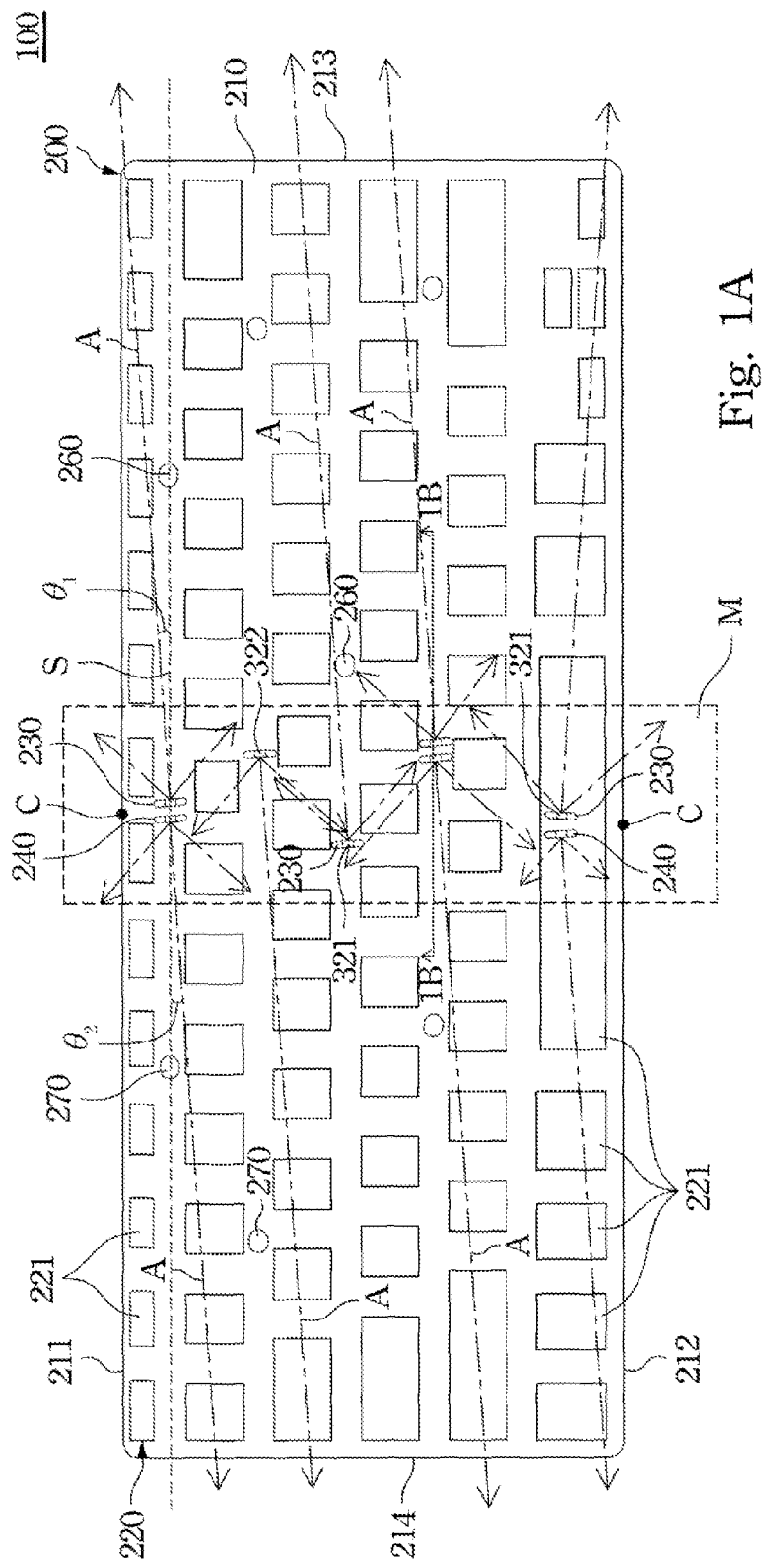
FIG. 1A is a top view and a schematic view of light angles of the backlight module according to one embodiment of the present invention.
Figure 1B:
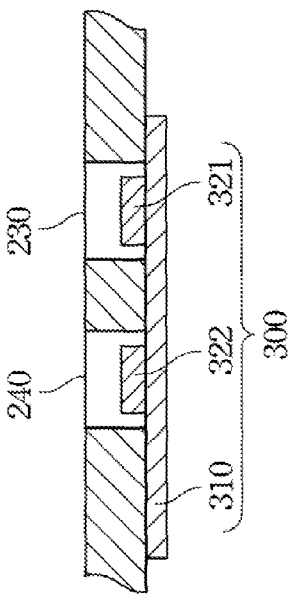
FIG. 1B is a cross sectional view taken along line 1B-1B of FIG. 1A.

Referring to FIG. 1A and FIG. 1B, wherein FIG. 1A is a top view and a schematic view of light angles of the backlight module according to one embodiment of the present invention; FIG. 1B is a cross sectional view taken along line 1B-1B of FIG. 1A.

According to the first embodiment of the present invention, the backlight module 100 comprises a light guide panel 200 and a light source set 300. The light guide panel 200 is provided with a rectangular light output surface 210 and a bottom surface opposite to the light output surface (not shown in figure), and plural side surfaces surrounding the light output surface and the bottom surface, in which the area of the light output surface and the bottom surface respectively is larger than that of any lateral surface. The periphery of the rectangular light output surface 210 has two opposite first sides (respectively defined as a first long side 211 and a second long side 212, in this embodiment) and two opposite second sides (respectively defined as a first short side 213 and a second short side 214, in this embodiment).

Moreover, the rectangular light output surface 210 is arranged with a plurality of microstructure rows 220 thereon. The extending direction of each microstructure row 220 is substantially parallel to the extending direction of the first long side 211 or the second long side 212. The microstructure rows 220 are respectively provided with plural microstructure patterns 221 spaced arranged with each other, all of the microstructure patterns 221 of the microstructure rows 220 are respectively arranged with respect to locations where the keys are installed on a keyboard.

The light guide panel 200 is installed with a plurality of recesses. The recesses are arranged on the light guide panel 200 and substantially arranged in a central zone M of the light guide panel 200. Because the inner wall of each recess of the light guide panel 200 can be served as a light input surface for guiding the incident light into the light guide panel 200, the incident light is emitted out through each microstructure pattern 221 from the light output surface for providing plural light emitting zones corresponding to the keys of the keyboard.

According to the first embodiment, the mentioned light source set 300 includes a flexible circuit board 310 and plural light emitting elements. The light emitting elements are respectively installed in the recesses one by one, and respectively emit lights towards the first short side 213 and the second short side 214 from the central zone M. The flexible circuit board 310 is installed on the other side of the light guide panel 200 opposite to the light output surface 210. The light emitting elements for example, can be light emitting diodes.

What shall be addressed is that, for satisfying different specifications of keys of keyboards, the microstructure patterns 211 of the microstructure rows 220 can be installed corresponding to the desired specifications and requirements of the keyboard keys. Therefore, through holes normally are not installed in each microstructure row 220, especially not installed between any two microstructure patterns 221 of each microstructure row 220, so the location of any microstructure pattern 221 is prevented from being occupied by the through holes. As a result, the through holes are respectively arranged on the light guide panel 200 and between any two adjacent microstructure rows 220.

According to the first embodiment, one of the light emitting element (hereinafter referred as a first light emitting element 321) is accommodated in one of the recesses (hereinafter referred as a first recess 230), and is mounted on the flexible circuit board 310 with an arrangement of emitting light towards the first short side 213. With the installation of the first light emitting element 321, one major light emitting axis A of the lights output from the first light emitting element 321 deviates from the through holes and directly reaches the first short side 213 without going through the through holes.

Substantially, when the first light emitting element 321, the first recess 230 and one of the through holes (hereinafter referred as a first through hole 260) are arranged between the two same microstructure rows 220, and the first through hole 260 is within a range defined through the first light emitting element 321 emitting light towards the first short side 213; even though the first through hole 260 is within the range defined through the first light emitting element 321 emitting light towards the first short side 213, a first included angle $\Theta 1$ (the first included angle $\Theta 1$ is at least 3 DEG (degree), preferably between 3-5 DEG) is defined by the major light emitting axis A of the first light emitting element 321 and a reference axis S parallel to the first long side 211 (or the second long side 212), the major light emitting axis A of the first light emitting element 321 does not pass through the first through hole 260, so as to reach the first short side 213 and close to the first long side 211 or the second long side 212 of the light guide panel 200 without any obstacle, so the luminance thereof is prevented from being untimely consumed.

Moreover, according to this embodiment, another light emitting element (hereinafter referred as a second light emitting element 322) is accommodated in another access (hereinafter referred as a second recess 240), and is installed on the flexible circuit board 310 with a fashion of emitting light towards the second short side 214. With the installation of the second light emitting element 322, one major light emitting axis A of the second light emitting element 322 deviates from the through holes and directly reaches the second short side 214.

Substantially, when the second recess 240 and one of the through holes (hereinafter referred as a second through hole 270) are arranged between the two same microstructure rows 220, and the second through hole 270 is within a range defined through the second light emitting element 322 emitting light towards the second short side 214; even though the second through hole 270 is within the range defined through the second light emitting element 322 emitting light towards the second short side 214, a second included angle ⊖2 (the second includes angle ⊖1 is at least 3 DEG, preferably between 3-5 DEG) is defined by the major light emitting axis A of the second light emitting element 322 and a reference axis S parallel to the first long side 211 (or the second long side 212), the major light emitting axis A of the second light emitting element 322 does not pass through the second through hole 270, so as to reach the second short side 214 and close to the first long side 211 or the second long side 212 of the light guide panel 200 without any obstacle, so the luminance thereof is prevented from being untimely consumed.

Moreover, the second recess 240 and the first recess 230 are not limited to be installed between the two same microstructure rows 220, or the second recess 240 and the first recess 230 are installed between two different microstructure rows 220.

Figure 2A:
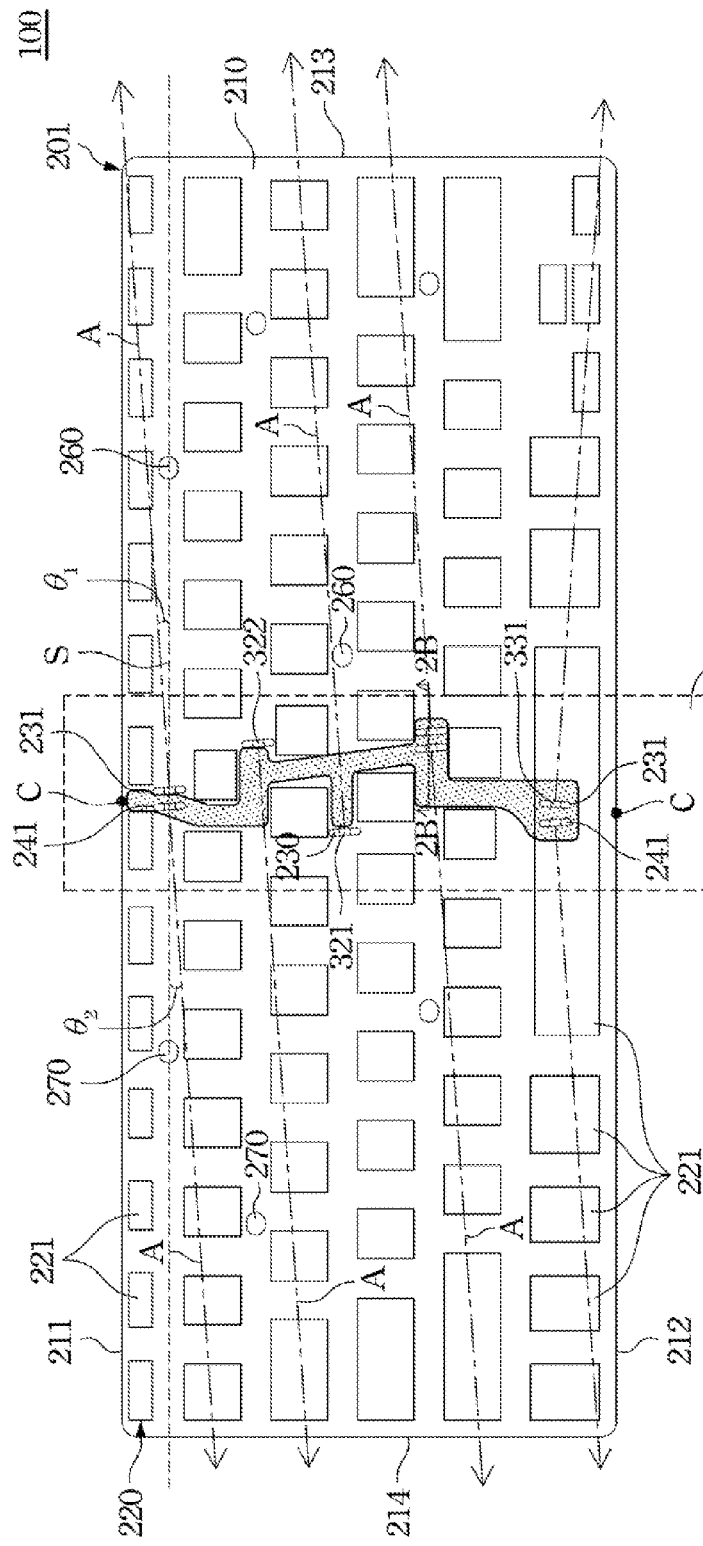
FIG. 2A is a top view and a schematic view of light angles of the backlight module according to a second embodiment of the present invention.
Figure 2B:
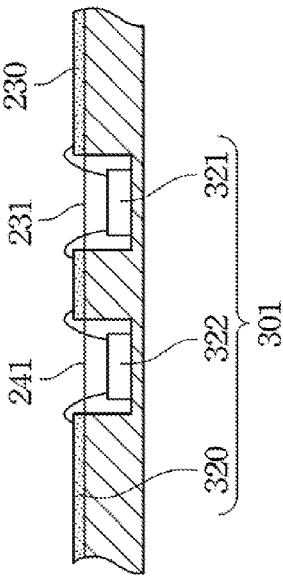
FIG. 2B is a cross sectional view taken along line 2B-2B of FIG. 2A.

Referring to FIG. 2A and FIG. 2B; wherein FIG. 2A is a top view and a schematic view of light angles of the backlight module according to a second embodiment of the present invention; FIG. 2B is a cross sectional view taken along line 2B-2B of FIG. 2A. For providing clearer figures, light emitting angles of light emitting elements are not shown but the major light emitting axes.

According to the second embodiment of the present invention, a light guide panel 201 is similar to the light guide panel 200 disclosed in the first embodiment, wherein one difference is that the recesses of the light guide panel 201 are non-penetrated recesses (as shown in FIG. 2B).

According to the second embodiment, the mentioned light source set 301 includes a silver paste circuit layer 320 and a plurality of first light emitting elements 321 and second light emitting elements 322. The silver paste circuit layer 320 is provided on the light output surface 210 of the light guide panel 201 within the central zone M, and is passes by the first non-penetrated recesses 231 and the second non-penetrated recesses 241.

According to the second embodiment, the first light emitting elements 321 are respectively accommodated in the first non-penetrated recesses 231 and electrically connected to the silver paste circuit layer 320. The second light emitting elements 322 are respectively accommodated in the second non-penetrated recesses 241 and electrically connected to the silver paste circuit layer 320. The light emitting elements 321, 322 can be light emitting diodes.

Furthermore, the first light emitting elements 321 respectively emit lights towards the first short side 213 in the central zone M; the second light emitting elements 322 respectively emit lights towards the second short side 214 in the central zone M. Because the arrangement of the first light emitting elements 321 and the second light emitting elements 322 are the same as that of the first embodiment, no further illustration is provided.

The present invention discloses more embodiments for showing and illustrating different arrangements of light emitting elements. In the following figures, for providing clearer figures, light emitting angles of light emitting elements are not shown but the major light emitting axes.

Figure 3:
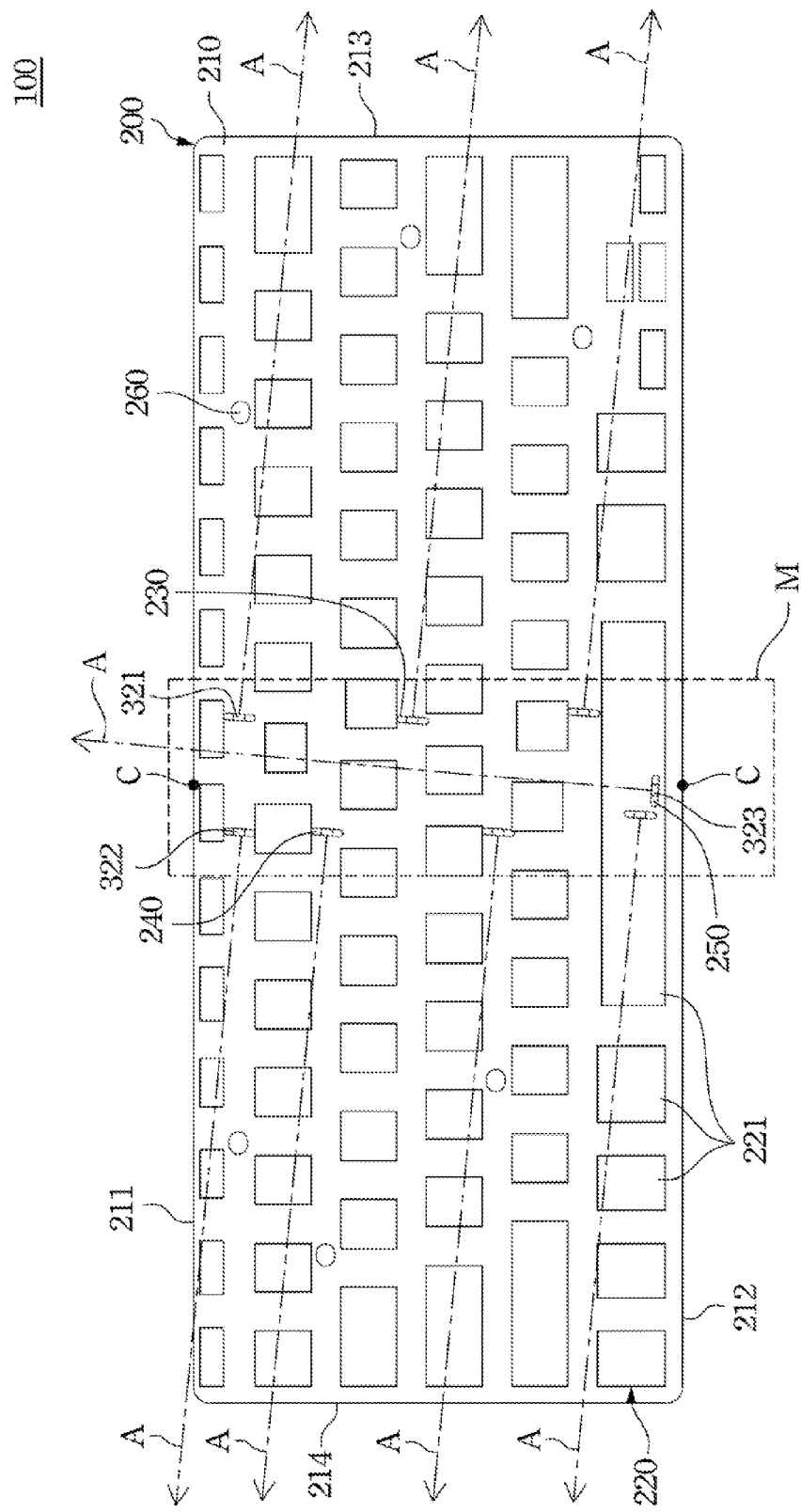
FIG. 3 is a top view showing the backlight module according to the third embodiment of the present invention.

Referring to FIG. 3, which is a top view showing the backlight module according to the third embodiment of the present invention. According to the third embodiment, the light source set is not limited to be the one disclosed in the first and second embodiments. One another light emitting element (hereinafter referred as a third light emitting element 323) is accommodated in one another recess (hereinafter referred as a third recess 250), and is arranged to emit lights towards the first long side 211 (or the second long side 212). With the installation of the third light emitting element 323, one major light emitting axis A of the third light emitting element 323 can pass a section of the light guide panel 200 between the first light emitting elements 321 and the second light emitting elements 322. As such, the light emitting luminance between the first light emitting elements 321 and the second light emitting elements 322 can be compensated, for increasing the illumination uniformity of the keyboard.

Substantially, the third recess 250 is installed on one of the microstructure patterns 221. But the third recess 250 is not limited to whether being installed on one of the microstructure patterns 221 or not.

Figure 4:
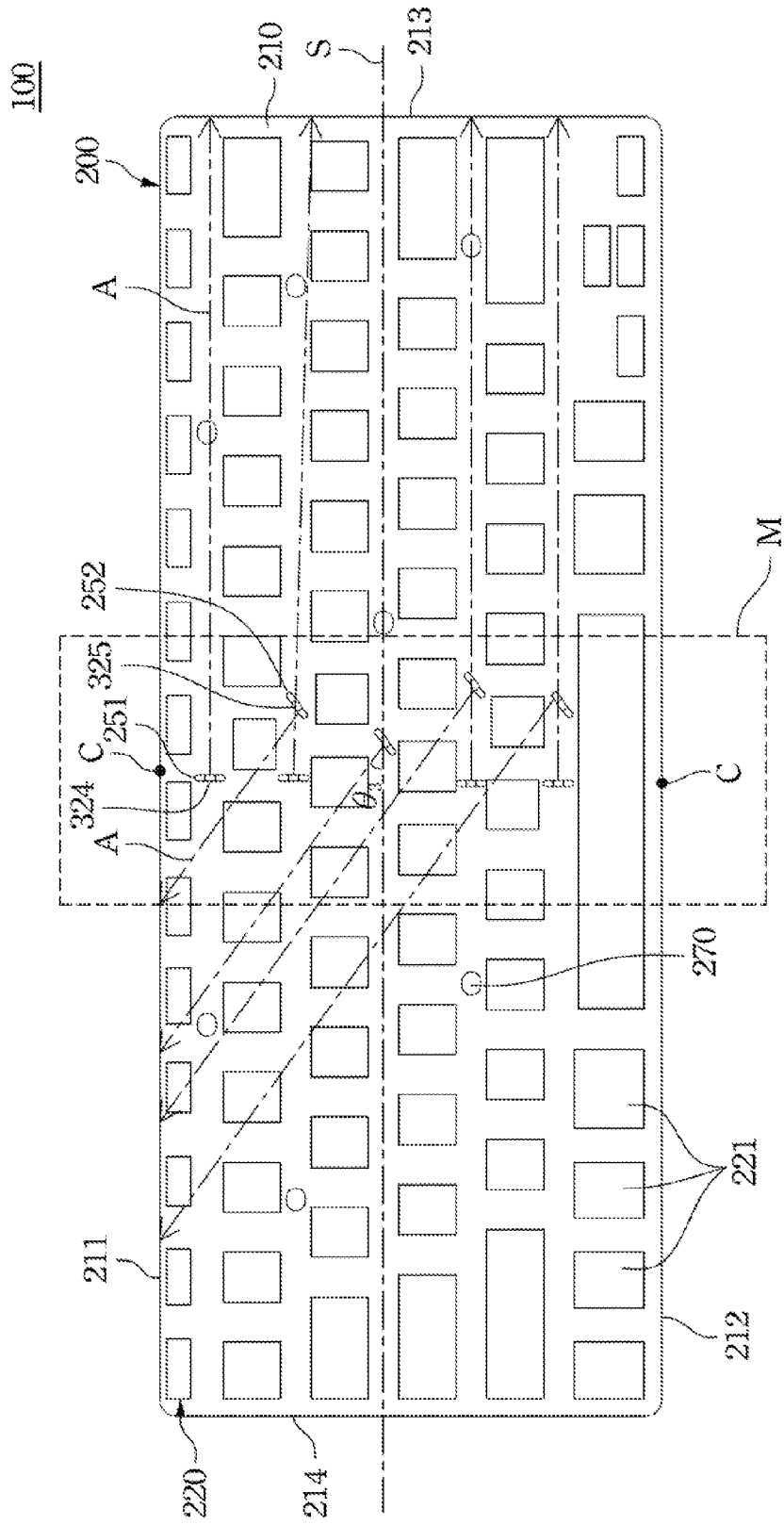
FIG. 4 is a top view showing the backlight module according to the fourth embodiment of the present invention.

Referring to FIG. 4, which is a top view showing the backlight module according to the fourth embodiment of the present invention. According to the fourth embodiment, the light emitting elements are not limited to the state disclosed in the first and second embodiments.

According to the fourth embodiment, light emitting elements can be plural fourth light emitting elements 324 and plural fifth light emitting elements 325 all installed in the central zone M; and all of the fourth light emitting elements 324 are closer to the second short side 214 with respect to the fifth light emitting elements 325. The fourth light emitting elements 324 are respectively accommodated in the recesses (hereinafter referred as fourth recesses 251), and arranged to emit lights towards the first long side 211. One major light emitting axis A of the fifth light emitting elements 325 is parallel to the reference axis S. The fifth light emitting elements 325 are respectively accommodated in the recesses (hereinafter referred as fifth recesses 252), and arranged to emit lights towards the first long side 211, and one major light emitting axis A of any fifth light emitting element 325 can pass through a section defined between every two adjacent fourth light emitting elements 324. As such, the light emitting luminance between two adjacent fourth light emitting elements 324 can be compensated for increasing the illumination uniformity of the keyboard. Substantially, a third included angle ⊖3, which is at least 5 DEG, is defined by each major light emitting axes A of all fifth light emitting elements 325 and the reference axis S parallel to the first long side 211 (or the second long side 212).

Figure 5:
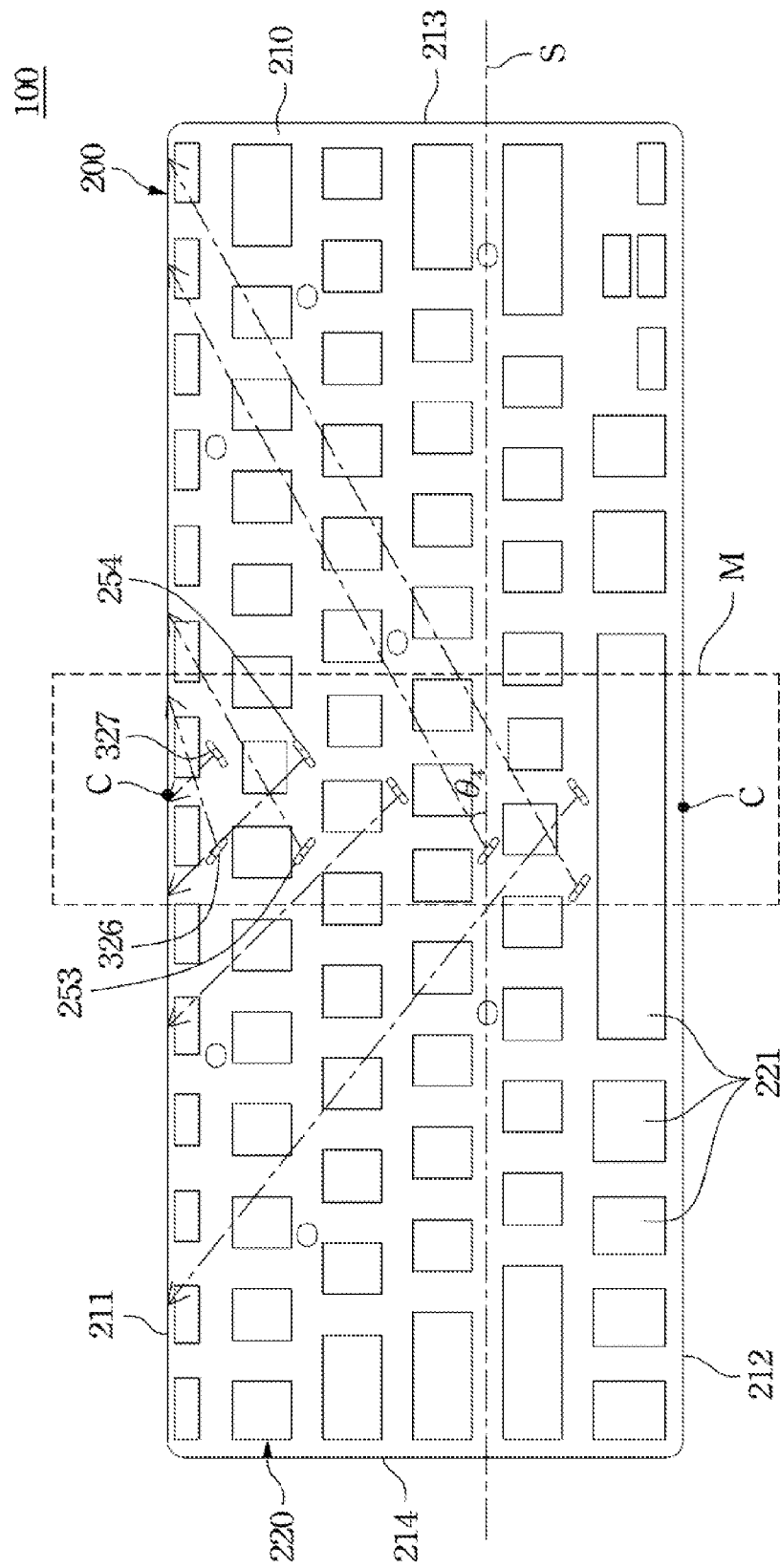
FIG. 5 is a top view showing the backlight module according to the fifth embodiment of the present invention.

Referring to FIG. 5, which is a top view showing the backlight module according to the fifth embodiment of the present invention. According to the fifth embodiment, the light source set is not limited to be the one disclosed in the first and second embodiments. Light emitting elements can be plural sixth light emitting elements 326 and plural seventh light emitting elements 327 all installed in the central zone M; and all of the sixth light emitting elements 326 are closer to the second short side 214 with respect to the seventh light emitting elements 327. The sixth light emitting elements 326 are respectively accommodated in sixth recesses and arranged to emit lights in a direction towards the first long side 211 and close to the first short side 213. One major light emitting axis A of the sixth light emitting elements 326 and the reference axis S define a fourth included angle ⊖4 which is at least 5 DEG. The seventh light emitting elements 327 are respectively accommodated in seventh recesses 254 and arranged to emit lights in a direction towards the first long side 211 and close to the second short side 213. One major light emitting axis A of the seventh light emitting elements 327 and the reference axis S define a fifth included angle ⊖5 which is at least 5 DEG. Moreover, the fourth included angles ⊖4 of the sixth light emitting elements 326 are different; and the fifth included angles ⊖5 of the seventh light emitting elements 327 are different. As such, the fifth embodiment can satisfy the requirement that the light output surface 210 of the light guide panel 200 providing a higher light emitting luminance at an area opposite to the first long side 211.

Figure 6:
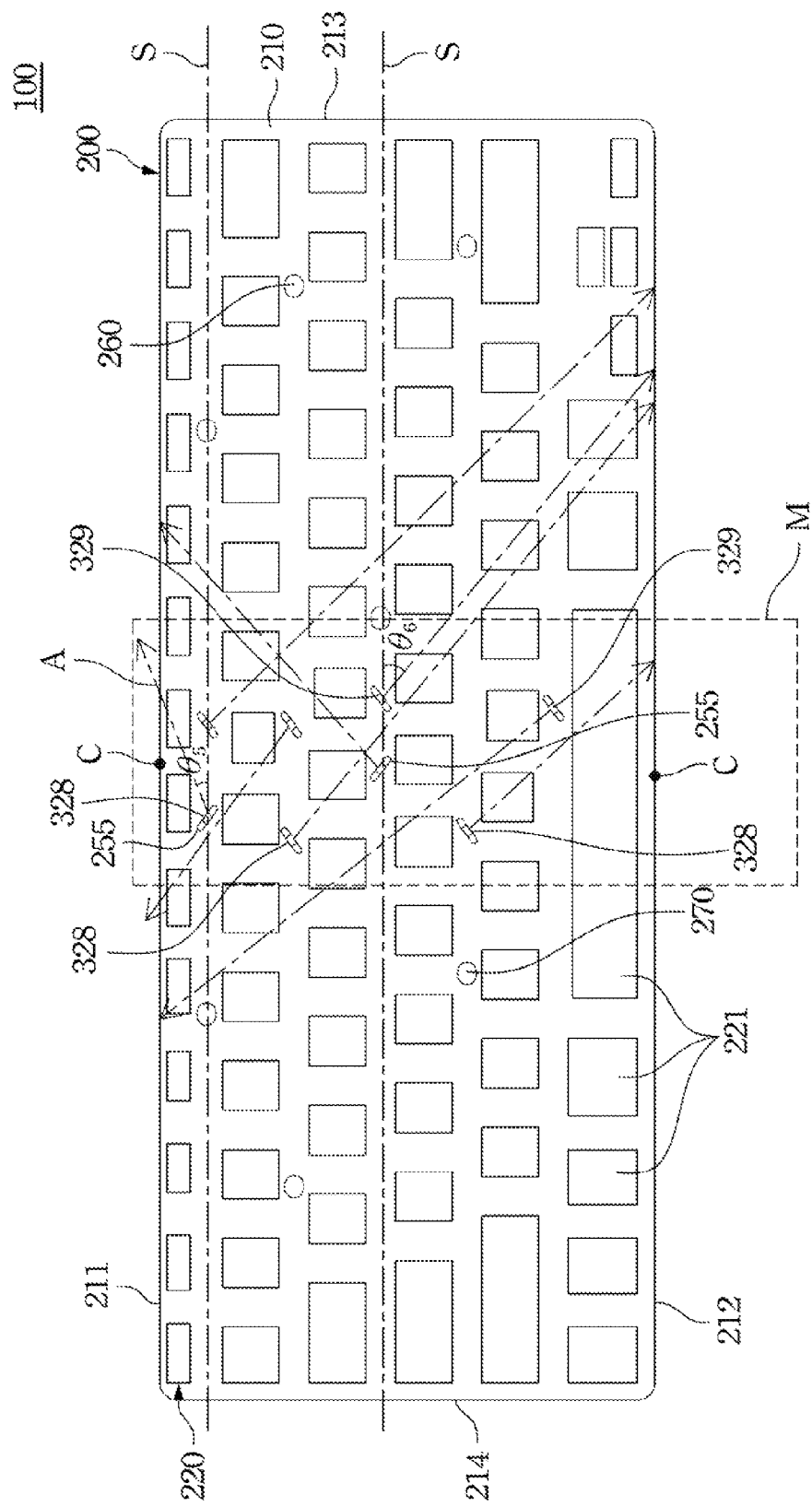
FIG. 6 is a top view showing the backlight module according to the sixth embodiment of the present invention.

Referring to FIG. 6, which is a top view showing the backlight module according to the sixth embodiment of the present invention. According to the sixth embodiment, the light source set is not limited to be the one disclosed in the first and second embodiments. Light emitting elements can be plural eighth light emitting elements 328 and plural ninth light emitting elements 329 all installed in the central zone M; and all of the eighth light emitting elements 328 are closer to the second short side 214 with respect to the ninth light emitting elements 329. The eight light emitting elements 328 are respectively accommodated in eighth recesses 255 and every two adjacent eighth light emitting elements 328 are respectively arranged to emit lights in a direction towards the first long side 211 and close to the first short side 213 or in a direction towards the second long side 212 and close to the first short side 213. One major light emitting axis A of the eighth light emitting elements 328 and the reference axis S define a fifth included angle ⊖5 which is at least 6 DEG.

The ninth light emitting elements 329 are respectively accommodated in ninth recesses 256 and every two adjacent ninth light emitting elements 329 are arranged to emit lights in a direction towards the second long side 212 and close to the first short side 213 or in a direction towards the first long side 211 and close to the second short side 214. One major light emitting axis A of the ninth light emitting elements 329 and the reference axis S define a sixth included angle ⊖6 which is at least 5 DEG. As such, the fifth embodiment can satisfy the requirement that the light output surface 210 of the light guide panel 200 providing a higher light emitting luminance at an area opposite to the first short side 213.

Figure 7:
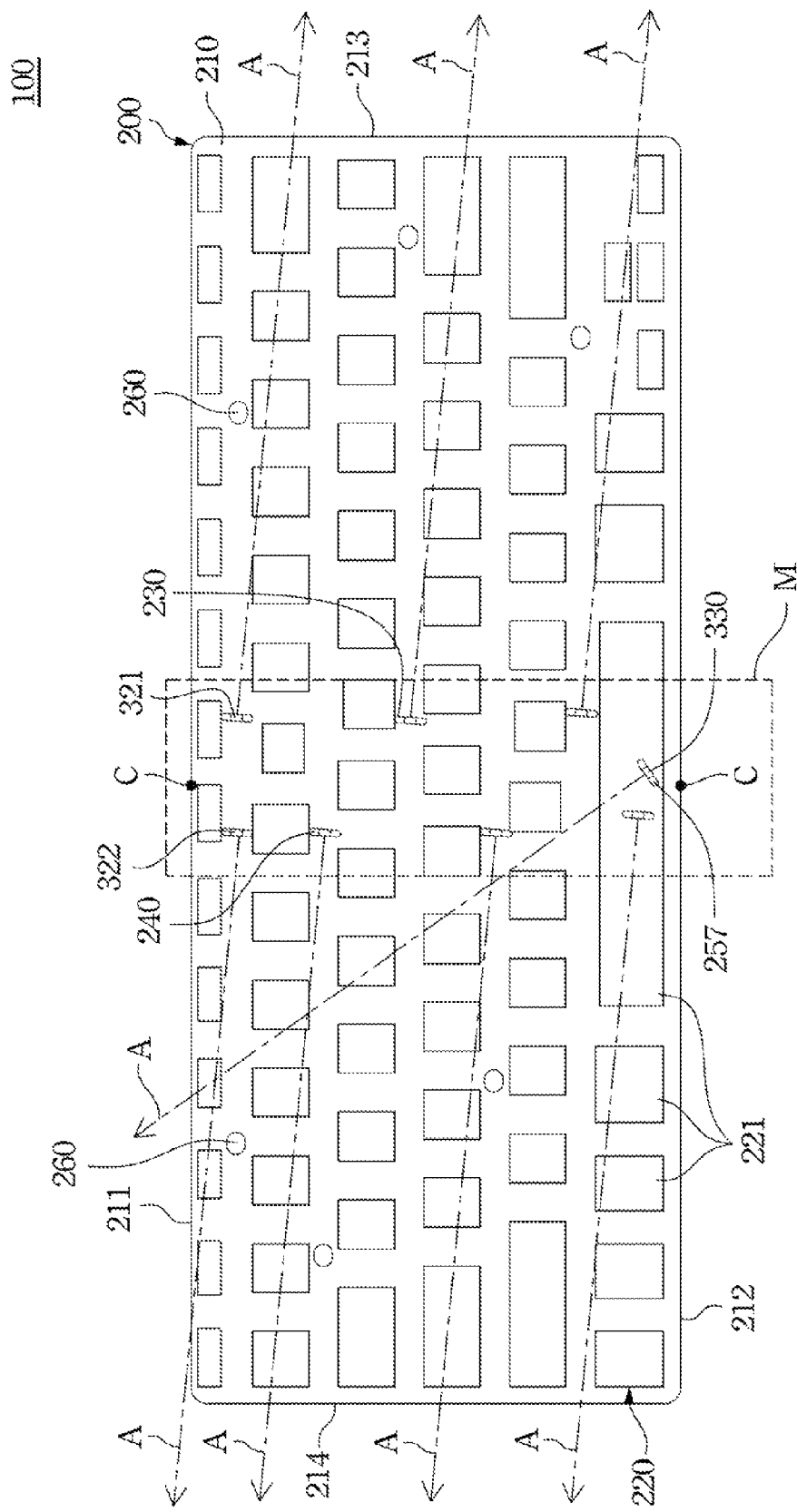
FIG. 7 is a top view showing the backlight module according to the seventh embodiment of the present invention.

Referring to FIG. 7, which is a top view showing the backlight module according to the seventh embodiment of the present invention. According to the seventh embodiment, the light source set is not limited to be the one disclosed in the first and second embodiments.

Light emitting elements can be at least one tenth light emitting element installed in the central zone M, and the tenth light emitting element is accommodated in a recess (hereinafter referred as a tenth recess 257), and the tenth light emitting element is arranged to emit lights towards the first long side 211. More substantially, one major light emitting axis A of the tenth light emitting element emits light in a direction towards the first long side 211 and close to the second short side 214 (i.e. away from the first short side 213); and S instead of passing through holes, the major light emitting axis A deviates from the through holes (e.g. the first through hole 260). As such, the light emitting luminance between two adjacent second light emitting elements 322 can be compensated for increasing the illumination uniformity of the keyboard. And as one alternative, the tenth recess is installed in one of the microstructure patterns 250.

Figure 8:
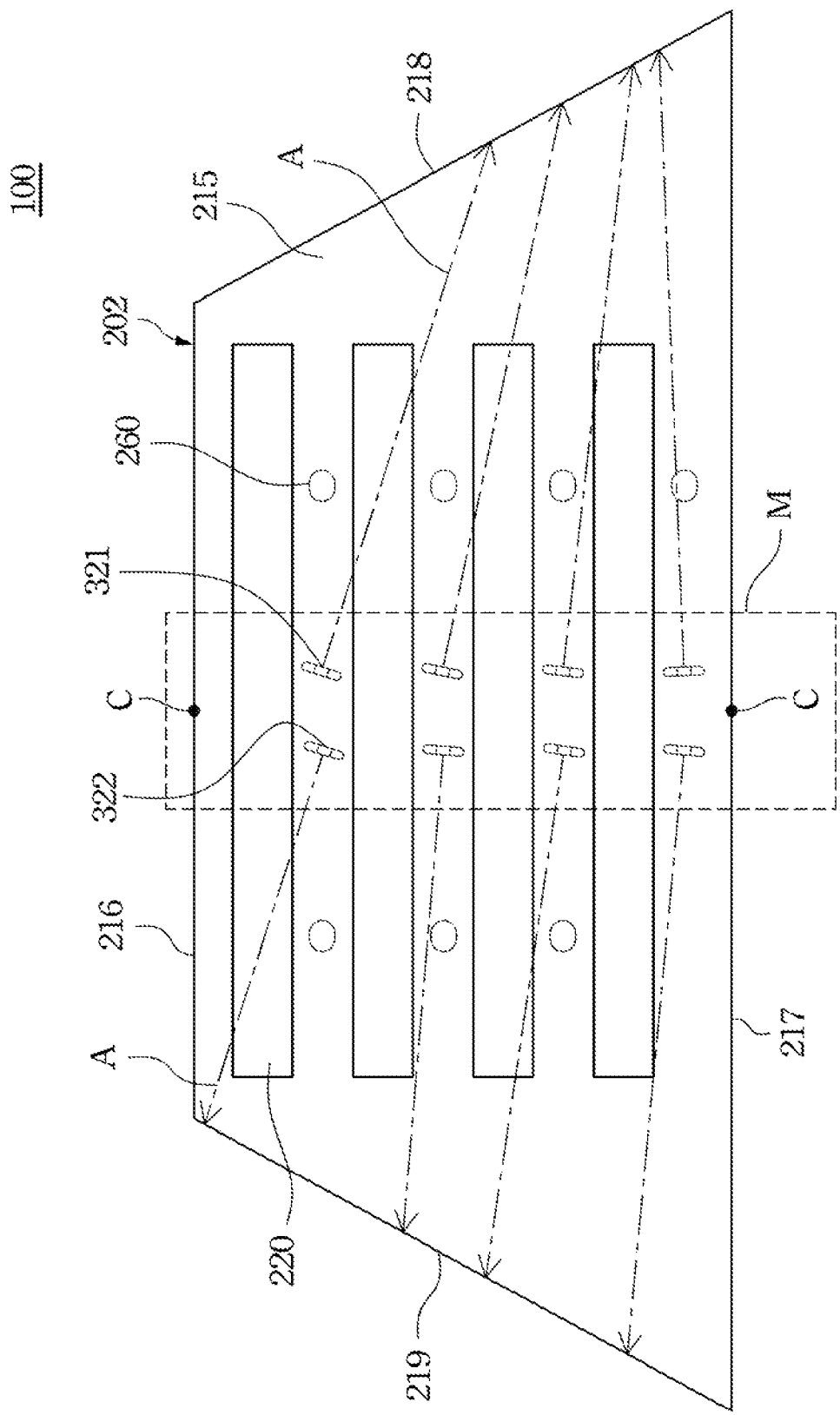
FIG. 8 is a top view showing the backlight module according to the eighth embodiment of the present invention.

Referring to FIG. 8, which is a top view showing the backlight module according to the eighth embodiment of the present invention. According to the eighth embodiment, the extending direction of each microstructure row 220 is substantially parallel to the extending direction of the first side. Each microstructure row 220 is not limited to be composed of plural microstructure patterns arranged at intervals, each microstructure row 220 could also be in an elongated strip shape. Moreover, the front side of a light guide panel 203 is not limited to a rectangular light output surface, and it can be a non-rectangular light output surface (such as a trapezoid light output surface 215). Substantially, the periphery of the trapezoid light output surface 215 has two opposite first sides in parallel (respectively defined as a short bottom side 216 and a long bottom side 217, in this embodiment) and two second sides which are not in parallel (respectively defined as a first inclined side 218 and a second inclined side 219, in this embodiment). As such, the first light emitting elements 321 can emit lights towards the first inclined side 218, and the major light emitting axis A thereof deviates from the first through holes 260. The second light emitting elements 322 emit lights towards the opposite second side, i.e. towards the second inclined side 219. Moreover, according to the seventh embodiment of the present invention, the backlight module 100 is not limited to be applied in a light emitting keyboard, it can be applied to other electronic devices capable of illuminating light and patterns, such as a phone or desk lamp.

What shall be defined is that the light emitting diode is directive to emit lights with a certain lighting angle, the major light emitting axis A of light emitting element refers to a light beam with maximum illumination within the lighting range of the light emitting diode. The mentioned central zone M is defined to be close to the light guide panel 200 and between a range defined by an imaginary line between a center point C of the first long side 211 and a center point C of the second long side 212. Another defining fashion of the central zone M is that the central zone M divides the light guide panel 200 into two areas which are substantially the same, and the central zone M can also occupy one third of the light guide panel 200. Moreover, the mentioned recesses being referred from first recess to ninth recess is only for providing a better illustration in this application, it does not suggest that the recesses are different in use.

Accordingly, the present invention deviates the major light emitting axis of light emitting element for dodging through holes, so as to be prevented from being affected by the through holes, and capable of reaching a corner location of the first side or the second side which are away from the light guide panel, so the first side or the second side of the light guide panel can be provided with a proper lighting luminance, and the lighting luminance at the corners of an electronic device is enhanced and the illumination uniformity of the whole electronic device is also increased.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A backlight module, comprising:
   a light guide panel, comprising:
      a light output surface having at least one first side, at least one second side, at least one first through hole, at least one first recess and plural microstructure rows, wherein the microstructure rows are spaced to be arranged on the light output surface, the extending direction of each microstructure row is parallel to the extending direction of the first side, the first through hole is installed between any two adjacent microstructure rows, and the first recess is installed in a central zone of the light output surface; and
   a first light emitting element disposed in the first recess, and arranged to emit lights towards the second side,
   wherein a major light emitting axis of the first light emitting element deviates from the first through hole.

2. The backlight module according to claim 1, wherein the first recess and the first through hole are installed between the two same microstructure rows, and an included angle is defined by the major light emitting axis of the first light emitting element and a reference axis parallel to the first side.

3. The backlight module according to claim 2, wherein the light output surface of the light guide panel further comprises:
   a second recess installed in the central zone; and
   the backlight module further comprises:
      a second light emitting element disposed in the second recess, and the light emitting direction thereof is opposite to the light emitting direction of the first light emitting element.

4. The backlight module according to claim 3, wherein a major light emitting axis of the second light emitting element is not parallel to the extending direction of the first side, and an included angle is defined by the major light emitting axis of the second light emitting element and a reference axis parallel to the first side.

5. The backlight module according to claim 4, wherein the light output surface of the light guide panel further comprises:
   a second through hole installed between the two same microstructure rows as the second recess being installed, wherein the major light emitting axis of the second light emitting element deviates from the second through hole.

6. The backlight module according to claim 4, wherein the included angle is at least 3 DEG.

7. The backlight module according to claim 4, wherein the second recess and the first recess are installed between the two same microstructure rows.

8. The backlight module according to claim 4, wherein the second recess and the first recess are not installed between the two same microstructure rows.

9. The backlight module according to claim 3, wherein the light output surface of the light guide panel further comprises:
   a third recess installed in the central zone; and
   the backlight module further comprises:
      a third light emitting element disposed in the third recess, and arranged to emit lights towards the first side,
   wherein a major light emitting axis of the third light emitting element passes through a section between the first light emitting element and the second light emitting element.

10. The backlight module according to claim 9, wherein each of the microstructure rows is provided with a plurality of microstructure patterns which are spaced to arrange with each other, the third recess is installed in one of the microstructure patterns.

* * * * *